United States Patent Office 3,297,738
Patented Jan. 10, 1967

3,297,738
CARBONATO DERIVATIVES OF ACETYLENIC HYDROPEROXIDES
Orville L. Mageli, Kenmore, N.Y., and James B. Harrison, Elyria, Ohio, assignors to Wallace & Tiernan, Inc., Buffalo, N.Y., a corporation of Delaware
No Drawing. Filed Apr. 29, 1965, Ser. No. 452,006
The portion of the term of the patent subsequent to Oct. 26, 1982, has been disclaimed
14 Claims. (Cl. 260—463)

This invention relates to novel peroxycarbonate derivatives of acetylenic hydroperoxides and to a method of preparing them.

This application is a continuation-in-part of our copending application Serial No. 836,599 filed August 28, 1959, now U.S. Patent 3,214,422.

In accordance with the broad aspects of our aforementioned copending application, an acetylenic polyfunctional peroxy compound of relatively large molecular weight is added to the polyethylene composition and crosslinking effected by heating the mixed composition.

These high molecular weight polyperoxy compounds comprise a class of polyfunctional, specifically difunctional, diperoxy compounds possessing at least two peroxy groups in the same molecule. It will be noted that in these compounds the carbon bearing the functional peroxy or hydroperoxy groups is separated in the molecule from another carbon bearing a functional peroxy or hydroperoxy group by not more than four carbon atoms.

The peroxycarbonate derivatives of acetylenic hydroperoxides, hereinatfer designated as peroxycarbonate derivatives, are one specific class of acetylenic difunctional peroxide crosslinking agents described in our aforementioned copending application.

A general object of the present invention is the use of peroxy compounds in the crosslinking of polymers and in the polymerization of ethylenically unsaturated monomers as well as curing of polyester resins.

The compounds, the peroxycarbonate derivatives of acetylenic hydroperoxides exhibit a marked improvement in safety and stability characteristics, as compared to the acetylenic dihydroperoxides, for example, 2,5-dimethyl-2,5-dihydroperoxy-hexyne-3, and 2,7-dimethyl-2,7-dihydroperoxy-octadiyne-3,5, are classed as Class A Explosives under Interstate Commerce Commission Regulations. The peroxycarbonate derivatives of this invention show surprising thermal and chemical stability when compared to prior art peroxycarbonate compounds. Strain, U.S. 2,370,588 and J. Am. Chem. Soc., 72, 1254–63 (1950), reports the spontaneous decomposition of a number of peroxy dicarbonates at normal room temperatures, and also of explosion of an unsaturated peroxy-carbonate on warming to room temperature. On the other hand peroxycarbonate derivatives are stable for periods of over one month on storage at 104° F. (40° C.).

THE HYDROPEROXIDE REACTANTS

The hydroperoxides used in the preparation of the peroxycarbonate derivatives of the invention include at least 2 peroxy groups (—OO—) at least one of which is a free hydroperoxide group (—OHH) and an aliphatic hydrocarbon backbone having 2–6 carbon atoms in a straight chain and at least one acetylenic bond (—C≡C—) in said backbone. The aforementioned peroxy groups may be attached to backbone carbon atoms or to "substituent" carbon atoms. The aforementioned backbone may be substituted by, in addition to the "peroxy groups" if any, by aliphatic hydrocarbon groups; substituted aliphatic groups, e.g., halo substituted; aromatic hydrocarbon groups; substituted aromatic groups; cycloaliphatic groups; substituted cycloaliphatic groups. Preferably the "substituents" group is (are) alkyl, cycloalkyl, alkcycloalkyl, aralkyl, aryl, alkaryl, and the corresponding halo and peroxysubstituted group(s). When the hydroperoxide reactant includes a substituted peroxy group (—OOR'), R' may be any one of the aforementioned "substituents," excluding aryl and alkaryl.

Typically alkyl substituents have 1–4 carbon atoms such as methyl, ethyl and t-butyl; aryl and alkaryl substituents are phenyl, tolyl, and xylyl; cycloalkyl and alkcycloalkyl are cyclopropyl, cyclopentyl, cyclohexyl and methylcyclohexyl; and aralkyl substituents are cumyl, and benzyl.

Illustrative of the preferred acetylenic dihydroperoxides are:

2,5-dimethyl-2,5-dihydroperoxy-hexyne-3,
3,6-dimethyl-3,6-dihydroperoxy-octyne-4,
1,1,4,4-tetraphenyl-1,4-dihydroperoxy-butyne-2,
Bis(cyclohexyl-1-hydroperoxy)acetylene and
2,7-dimethyl-2,7-dihydroperoxy-octadiyne-3,5.

The acetylenic dihydroperoxides are readily prepared by the reaction of hydrogen peroxide and the appropriate acetylenic glycol in an acidic medium, according to the methods described by Milas in U.S. 2,670,384 and U.S. 2,694,092.

A and C illustrate formulas where the peroxy groups are attached to backbone carbon atoms and B where the peroxy groups are attached to substituent groups.

(A)
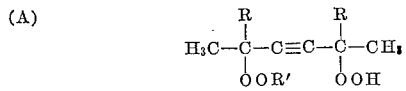

where R may be an aforementioned "substituent" or hydrogen and R' may be a "substituent."

(B)
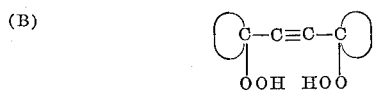

where
is cycloaliphatic.

(C)
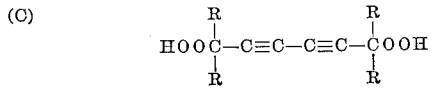

THE HALOCARBONATES

Halocarbonates
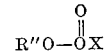

also known as haloformates, operable in the preparation of the compounds of this invention are those where the radical R" is an aforementioned "substituent."

Illustrative chlorocarbonates, the generally most available form, are those where the radical R" is: methyl-, ethyl-, beta-chloroethyl-, n-propyl-, isopropyl-, 3-chloropropyl-, n-butyl, isobutyl-, 2-ethylbutyl-, n-amyl-, n-hexyl-, 2-ethyl hexyl-, n-octyl-, lauryl-, cyclohexyl-, allyl-, p-nitrobenzyl-, and phenyl-.

Also operable, but resulting generally in mixtures of polymeric or cyclic products, are the bis chloroformates of: glycerol, monoethylene glycol, diethylene glycol-, and butylene glycol.

COMPOUNDS OF THE INVENTION

The peroxycarbonate derivative is prepared by reacting, in an alkaline organic solvent reaction medium, the defined acetylenic hydroperoxide with the defined halocarbonate at a temperature of about 0° C. to 20° C.

Some of the representative preparatory reactions are illustrated by the following equations:

Equation (A)

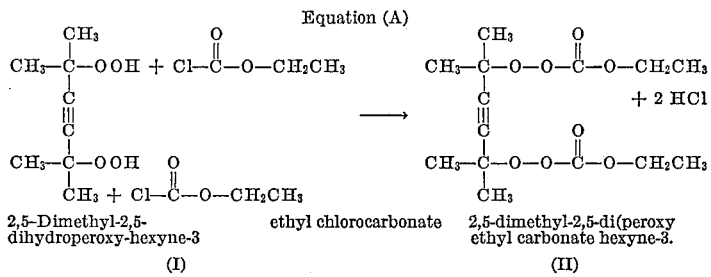

2,5-Dimethyl-2,5-dihydroperoxy-hexyne-3    ethyl chlorocarbonate    2,5-dimethyl-2,5-di(peroxy ethyl carbonate hexyne-3.

(I)            (II)

Equation (B)

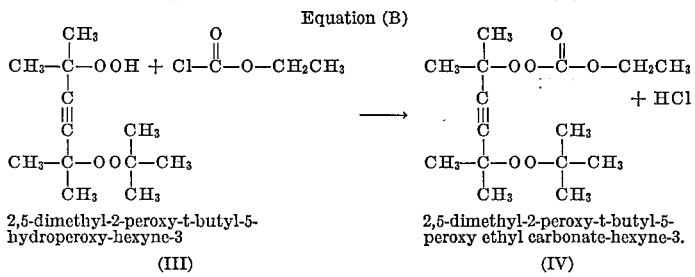

2,5-dimethyl-2-peroxy-t-butyl-5-hydroperoxy-hexyne-3    2,5-dimethyl-2-peroxy-t-butyl-5-peroxy ethyl carbonate-hexyne-3.

(III)            (IV)

When stoichiometric quantities of reactants are chosen with the dihydroperoxide (I) above, the diperoxy carbonato derivative (II) results.

Mixed derivatives can also be prepared, by using one-half the stoichiometric amount of the halocarbonate reactant to form a monoperoxycarbonate derivative. The free hydroperoxide group may then be reacted further to form the desired mixed derivative.

Alternatively, mixed derivatives such as (IV) may be prepared as shown in Equation B, above. This reaction is not intended to be limited to the compounds shown, as the t-butyl group may be replaced by any one of the aforementioned "substituents."

The new compounds are either solids or high boiling oils which possess particular efficiency as cross-linking agents for polyethylene and as initiators of polymerization reactions. These compounds are also high temperature initiators for the curing of unsaturated polyesters.

Illustrative compounds of the invention are shown in general structural formulas:

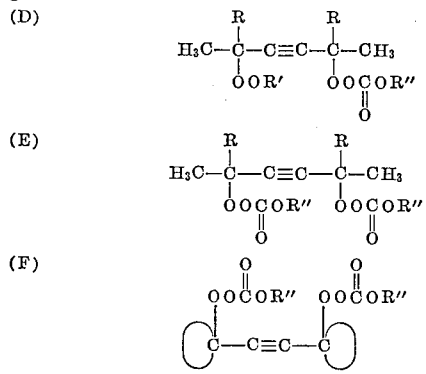

Broadly the compounds of the invention has the formula G:

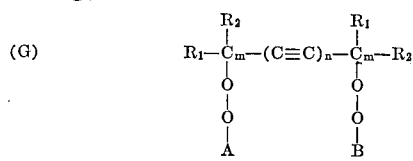

where $n$ is an integer having the value 1 to 2; the straight chain hydrocarbon backbone is selected from the class consisting of —(C≡C)$_n$—, and

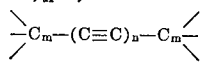

$R_1$ and $R_2$ are selected from the class consisting of aliphatic, cycloaliphatic, aromatic, and $R_1$ and $R_2$ joined together to form, with $C_m$, an alicyclic ring; A is an alkoxycarbonyl group,

where R″ is selected from the class consisting of aliphatic cycloaliphatic, and aromatic; and B is selected from the class consisting of A and R′, where R′ is selected from the class consisting of hydrogen, aliphatic, cycloaliphatic, and aralkyl; $m$ is an identifying symbol.

ILLUSTRATIVE COMPOUNDS

The following examples are given as specific illustrations of representative compounds prepared within the scope of the invention and are not to be deemed as limitative of the invention. In substantially all instances, the active oxygen content (Act. (O)) was determined by accepted standard procedures, as for instance, "iodide"-"thiosulfate" titration; by ultimate analysis for carbon and hydrogen; or by molecular refraction ($MR_D$), and, in some instances, some or all of these identification techniques were employed.

*Example 1.—2,5-dimethyl-2,5-di(peroxy ethyl carbonate)-hexyne-3*

Into a solution of 10.4 g. of 93.5% (0.056 mole) of 2,5-dimethyl-3-hexyne-2,5-dihydroperoxide in 200 ml. of ethyl ether and 28.7 g. (0.35 mole) pyridine at 0° C. was added, dropwise, 13 g. (0.12 mole) of ethyl chlorocarbonate. The temperature was maintained at ±2° C. through the addition and for the subsequent 45 minute reaction periods. The reaction mixture was then filtered to remove precipitated pyridine hydrochloride, the ethereal filtrate thoroughly washed (5% HCl, water) then dried. Filtration and removal of the ether under reduced pressure gave 14.5 g. (82% yield) of a white solid. Recrystallized the melting point was 41–43° C.

Calc'd for $C_{14}H_{22}O_8$: C, 52.82; H, 6.97; Act. (O) 10.05. Found: C, 52.90; H, 6.81; Act. (O) 10.05.

*Example 2.—2,5-dimethyl-2,5-di(peroxy-β-chloroethyl carbonate)hexyne-3*

Into a solution of 34.8 g. of 92% (0.184 mole) of 2,5-dimethyl-3-hexyn-2,5-dihydroperoxide in 200 ml. of ethyl ether and 35.6 g. (0.45 mole) pyridine at 0° C. was added, dropwise, 57.2 g. (0.4 mole) of β-chloroethyl chlorocarbonate. The temperature was maintained at 0±2° C. through the addition and for the subsequent 45 minute reaction periods. The reaction mixture was then filtered thoroughly washed (5% HCl, water) then dried. Filtration and removal of the ether under reduced pressure gave 45 g. (64% yield) of a white solid. Recrystallized the melting point was 60–61° C.

Calc'd for $C_{14}H_{20}Cl_2O_8$: C, 43.42; H, 5.21; Cl, 18.31; Act. (O) 8.26. Found: C, 43.76; H, 5.20; Cl, 18.33; Act. (O) 8.30.

*Example 3.—2,5-dimethyl-2,5-di(peroxy n-propyl carbonate)hexyne-3*

Into a solution of 28.3 g. of 92% (0.15 mole) of 2,5-dimethyl-3-hexyne-2,5-dihydroperoxide in 300 ml. of ethyl ether and 27.8 g. (0.35 mole) pyridine at 0° C. was added, dropwise, 36.8 g. (0.3 mole) of n-propyl chlorocarbonate. The temperature was maintained at 0±2° C. through the addition and for the subsequent 45 minute reaction periods. The reaction mixture was then filtered to remove precipitated pyridine hydrochloride, the ethereal filtrate thoroughly washed (5% HCl, water) then dried. Filtration and removal of the ether under reduced pressure gave 50 g. (89% yield) of a pale yellow oil: $n_D^{25}$, 1.4382 $d_4^{25}$, 1.043.

Calc'd for $C_{16}H_{26}O_8$: C, 55.48; H, 7:57; Act. (O) 9.24. Found: C, 55.46; H, 7.54; Act. (O) 9.23.

*Example 4.—2,5-dimethyl-2,5-di(peroxyisopropyl carbonate)hexyne-3*

Into a solution of 62.0 g. (0.327 mole) of 2,5-dimethyl-2,5-dihydroperoxy-hexyne-3, and 52.6 g. (0.665 mole) pyridine in 500 ml. of ethyl ether, was added, dropwise, with stirring, 81.7 g. (0.665 mole) isopropyl-chlorocarbonate. The temperature was maintained at about 5°–10° C. during the 45 minute addition period. The reaction was stirred an additional 3 hours and the temperature allowed to rise to about 15° C. The precipitated pyridine-hydrochloride was removed by filtration, the ethereal filtrate thoroughly washed and dried. Removal of the solvent under reduced pressure gave 100.8 g. (90% yield) of a light yellow oil.

Calc'd for $C_{16}H_{26}O_8$: A(O) 9.25. Found: A(O) 8.76.

*Example 5.—2,5-dimethyl-2,5-di(peroxy n-butyl carbonate)hexyne-3*

Into a solution of 20.8 g. of 93.5% (0.11 mole) of 2,5-dimethyl-3-hexyn-2,5-dihydroperoxide in 200 ml. of ethyl ether and 23.8 g. (0.30 mole) pyridine at 0° C. was added, dropwise, 32.8 g. (0.24 mole) of n-butyl chlorocarbonate. The temperature was maintained at 0±2° C. through the addition and for the subsequent 45 minute reaction periods. The reaction mixture was then filtered to remove precipitated pyridine hydrochloride, the ethereal filtrate thoroughly washed (5% HCl, water) then dried. Filtration and removal of the ether under reduced pressure gave 42 g. of 95.8% product (95.8% yield) of a colorless oil: $n_D^{25}$ 1.4399; $d_4^{25}$ 1.026.

Calc'd for $C_{18}H_{30}O_8$: Act. (O) 8.55. Found: Act. (O) 8.12.

*Example 6.—2,5-dimethyl-2,5-di(peroxy isobutyl carbonate)hexyne-3*

Into a solution of 28.3 g. of 92% (0.15 mole) of 2,5-dimethyl-3-hexyn-2,5-dihydroperoxide in 200 ml. of ethyl ether and 28.7 g. (0.35 mole) pyridine at 0° C. was added, dropwise, 40.9 g. (0.3 mole) of isobutyl chlorocarbonate. The temperature was maintained at 0±2° C. through the addition and for the subsequent 45 minute reaction periods. The reaction mixture was then filtered to remove precipitated pyridine hydrochloride, the ethereal filtrate thoroughly washed (5% HCl, water) then dried. Filtration and removal of the ether under reduced pressure left 53.5 g. of a product assaying 95.4% (91% yield) of a colorless oil: $n_D^{25}$ 1.4380; $d_4^{25}$ 1.019.

Calc'd for $C_{18}H_{30}O_8$: C, 57.76; H, 8.02; Act. (O) 8.55. Found: C, 57.53; H, 8.10; Act. (O) 8.50.

*Example 7.—3,6-dimethyl-3,6-di(peroxy ethyl carbonate)-octyne-4*

To a cold (10° C.) mixture of 75 ml. of petroleum ether, 10.4 g. (0.05 mole) of 97% 3,6-dimethyl-3,6-dihydroperoxyoctyne-4, and 10.8 g. (0.10 mole) of ethyl chloroformate was added 11.1 g. (0.14 mole) of pyridine. The addition was carried out over a 10 minute period. The temperature was then allowed to rise to 15° C. during the reaction period of 15 minutes. The reaction mixture was filtered to remove pyridine hydrochloride and thoroughly washed (water, saturated tartaric acid, 10% sodium carbonate) to remove impurities. After drying over anhydrous magnesium sulfate, the solution was filtered and the solvent removed under reduced pressure to yield 12.1 g. (70% yield) of an oil assaying 97.5% peroxide: $n_D^{25}$ 1.4449; $d_4^{25}$ 1.0568; M.R. (calc'd) 85.08; (obsd.) 87.21.

*Example 8.—2,7-dimethyl-2,7-di(peroxy ethyl carbonate)-octadiyne-3,5*

Into a solution of 5.0 g. of 95% (0.025 mole) of 2,7-dimethyl-3,5-octadiyne-2,7-dihydroperoxide in 100 ml. of ethyl ether and 4.8 g. (0.06 mole) pyridine at 0° C. was added, dropwise, 5.4 g. (0.05 mole) of ethyl chlorocarbonate. The temperature was maintained at 0±2° C. throughout the addition and for the subsequent 40 minute reaction period. The reaction mixture was then filtered to remove precipitated pyridine hydrochloride, the ethereal filtrate thoroughly washed (5% HCl, water) and dried. Filtration and removal of the ether under reduced pressure left 4.5 g. (52.5% yield) of a white solid. Recrystallized the melting point was 90–91° C.

Calc'd for $C_{16}H_{22}O_8$: C, 56.13; H, 6.47; Act. (O) 9.35. Found: C, 55.89; H, 6.25; Act.(O) 9.40.

*Example 9.—Bis (cyclohexyl-1-peroxy ethyl carbonate) acetylene*

To a cold (10° C.) solution of 8.7 g. (0.032 mole) of 93.8% bis (cyclohexyl-1-hydroperoxy) acetylene and 7.0 g. (0.064 mole) of ethyl chlorocarbonate in 75 ml. of ethyl ether was added, with stirring, 7.9 g. (0.10 mole) of pyridine. After stirring for an additional 15 minutes (15° C.), the reaction mixture was filtered to remove pyridine hydrochloride, thoroughly washed (water, saturated tartaric acid, 10% sodium carbonate, water) to remove impurities, dried over anhydrous magnesium sulfate, filtered, and the solvent removed under reduced pressure to yield 9.8 g. (73.5% yield) of a light yellow oil.

Calc'd for $C_{20}H_{20}O_8$: Act. (O) 8.04. Found: Act. (O) 7.68.

*Example 10.—1,1,4,4-tetraphenyl-1,4-di(peroxy ethyl carbonate)-butyne-2*

Into a solution of 2.11 g. (0.005 mole) of 1,1,4,4-tetraphenyl-1,4-dihydroperoxy-butyne-2 in 75 ml. of ethyl ether and 1.0 g. (0.125 mole) pyridine at about 5° C. was added, dropwise with stirring, 1.08 g. (0.010 mole) of ethyl chlorocarbonate. The temperature was allowed to gradually rise to room temperature, about 25° C., over a period of one hour. The reaction mixture was then filtered to remove precipitated pyridine hydrochloride, the ethereal filtrate thoroughly washed (5% HCl, water) and dried. Removal of the ether under reduced pressure gave 0.6 g. of a white solid, whose melting point was 110–112° C.

Calc'd for $C_{34}H_{30}O_8$: Act. (O) 5.6. Found: Act. (O) 5.3.

*Example 11.—2,5-dimethyl-2-peroxy t-butyl-5-peroxy carbonate-hexyne-3*

Into a cold (5° C.) solution of 12.3 g. (0.05 mole) of 93.5% 2,5-dimethyl-2-peroxy t-butyl-5-hydroperoxy-hexyne-3 in 100 ml. of petroleum ether, 4.0 g. (0.05 mole) of 50% sodium hydroxide was added with stirring. The reaction temperature was allowed to rise to 10° C. over a 15 minute period. Ethyl chlorocarbonate 7.6 g. (0.07 mole) was added dropwise with stirring maintaining the reaction temperature below about 10° C. After an additional 2 hours reaction time at about 10–15° C., water was added to dissolve the precipitated sodium chloride and the ethereal phase separated and washed thoroughly until neutral. After drying over anhydrous magnesium sulfate, and removal of the solvent under reduced pressure, 14.2 g. (93.5% yield) of an oil was obtained: $n_D^{25}$ 1.4342; $d_4^{25}$ 0.9725.

Calc'd for $C_{15}H_{26}O_6$: Act. (O) 5.2; M.R. 78.81. Found: Act. (O) 4.4; M.R. 80.73.

CROSSLINKING OF POLYETHYLENE

In order to obtain test results showing the relative order of the effectiveness of crosslinking, weighed samples of commercial polyethylene compositions were heated in a chosen solvent in the presence of a specified weight percent of a diperoxy compound, such specified weight percent generally being from about 1% to 10% by weight, based upon the weight of the polyethylene composition, and the mixture heated under specified conditions. The amount of end product insoluble in the solvent was then determined, from which date the degree of crosslinking could be calculated. This is a standard test and is described in J. Polymer Sci., 31, 127 (1958).

The modified test to determine crosslinking, as employed herein, consisted in dissolving, under heating, 10 parts by weight of the polyethylene composition in 35 parts by weight of xylene. When the polyethylene was dissolved in the xylene, the mixture was cooled to about 90° C., the weighed amount of the crosslinking agent was then added and the mixture heated upon a hot-plate for about 20 minutes until a gel was produced.

The gel was recovered and cut into small pieces which were then refluxed with a measured amount (200 ml.) of xylene, for approximately one hour. The insoluble residue was then collected and freed of xylene by a slow-moving current of air at room temperature and weighed. By this quick test for the percent of crosslinking, the relative order of the effectiveness of any crosslinking agent can be obtained, such percent being obtained by dividing the weight of the dried, insoluble refluxed residue by 10 and multiplying by 100.

The crosslinking agents of the present invention possess a relatively favorable half-life so that the admixing can be performed at moderately elevated temperatures with the advantages attendant upon this type of procedure. After uniform distribution of the crosslinking agent in the polymer, the admixture can then be formed and shaped by conventional procedures, such as formation into films and filaments, or molding in conventional ways, as by extrusion or by injection molding, or other manipulations demanded by this type and kind of end product desired.

In the tabulation appended below there is listed the crosslinking action of representative members of the carbonato derivatives of the present invention. The tabulation describes the quantity of xylene insoluble product produced and which is representative of the degree of crosslinking generated by the compound of the invention.

Polyethylenes of various molecular weights are available on the market, and the types of these polymers are described by Lawton et al. in Industrial and Engineering Chemistry, 46, 1703–1709. Various companies offer commercial polyethylenes and for the purposes of the tests described herein, polyethylene compositions, as sold by E. I. du Pont de Nemours, Inc., Wilmington, Delaware, under the designation Alathon 1, 3, 10, 12, 14, etc., were employed specifically Alathon 10 and Alathon 3. Since carbon black occurs on the market in various stages of acidity; that is, acid, neutral and alkaline types, an example of crosslinking in the presence of carbon black, as filler, is also appended. It will be noted from the table that the compounds of the invention all induce crosslinking in accordance with the testing procedure outlined herein. When actually milled with polyethylene compositions, formed and cured end products result which possess an increased resistance to deformation under heat, decreased solubility, and increased tensile strength, all desirable characteristics tending to increase the field of use of these versatile polymers.

TABLE 1.—POLYETHYLENE CROSSLINKING AT 5% CONCENTRATION

| | Compound Tested | Percent Crosslinked Material Insoluble in Xylene | |
|---|---|---|---|
| | | Alathon–10 | Alathon–3 |
| 1 | 2,5-Dimethyl-2,5-di (peroxy-n-propyl carbonate) hexyne-3. | 53 | 55 |
| 2 | 2,5-Dimethyl-2,5-di (peroxy isobutyl carbonate) hexyne-3. | 52 | 39 |
| 3 | 2,5-Dimethyl-2,5-di (peroxy ethyl carbonate) hexyne-3. | 36 | 43 |
| 4 | 2,7-Dimethyl-2,7-di (peroxy ethyl carbonate) octadiyne-3.5. | 19 | |

The peroxide heretofore recommended as most efficient for the commercial crosslinking of polyethylene compositions comprised the monoperoxide dicumyl peroxide. There is shown in Table 2 the results of comparative crosslinking efficiency of the compounds of the invention and dicumyl peroxide at the 5% level.

TABLE 2

| Peroxide Molecular Weight | Peroxide | Percent Material Crosslinked |
|---|---|---|
| Alathon–10: | | |
| 270 | Dicumyl (Dicup) | 61 |
| 386 | 2,5-Dimethyl-2,5-di (peroxy beta chloroethyl carbonate) hexyne-3. | 67 |
| 398 | 1,1'-Dicyclohexyl-1,1-di (peroxyethyl carbonate)-acetylene. | 65 |
| Alathon–3: | | |
| 270 | Dicumyl (Dicup) | 37 |
| 346 | 2,5-Dimethyl-2,5-di (peroxy n-propyl carbonate) hexyne-3. | 55 |
| 374 | 2,5-Dimethyl-2,5-di (peroxy isobutyl carbonate) hexyne-3. | 39 |
| 431 | 3,6-Dimethyl-3,6-di (peroxy ethyl carbonate) octyne-4. | 55 |
| 318 | 2,5-Dimethyl-2,5-di (peroxy ethyl carbonate) hexyne-3. | 43 |
| Alathon–10:[2] | | |
| 270 | Dicumyl (Dicup) | 62 |
| 374 | 2,5-Dimethyl-2,5-di (peroxy isobutyl carbonate) hexyne-3. | 63 |

[2] Carbon Black was dispersed in the Alathon-xylene solution.

The compounds of the invention are effective crosslinking agents with any of the essentially saturated polyolefin solids such as polyethylene, polypropylene, ethylene-propylene copolymers, and polybutene.

POLYESTER RESIN POLYMERIZATION

The compounds of the present invention are polymerization initiators for curing unsaturated polyester resins. In general they require higher temperatures as compared to benzoyl peroxide, the standard initiator for the polyester industry.

Polymerization tests were carried out using the "S.P.I. Procedure for Running Exotherm Curves-Polyester Resins" published in the Preprint of the 16th Annual Conference, Reinforced Plastics Division, Society of the Plastics Industry, Inc., February 1961.

The tests were run on a standard resin of the following composition:

Maleic anhydride _____ moles__ 1.0
Phthalic anhydride _____ do____ 1.0
Propylene glycol _____ do____ 2.2
Acid No. of alkyl resin product _____ 45–50
Inhibitor added (hydroquinone) _____ percent__ 0.013

7 parts of the above alkyl resin were diluted with 3 parts of styrene monomer.

The amount of peroxycarbonate derivative used to initiate polymerization was calculated to provide an active oxygen content equivalent to that provided by 1% by weight benzoyl peroxide (Act. (O)–6.6%).

The exotherm data obtained, using a 212° F. bath, for representative peroxy carbonate derivatives of 2,5-dimethyl-2,5-dihydroperoxy-hexyne-3 are set out in Table 3.

TABLE 3

| | Benzoyl Peroxide | Exotherm Measurements at 212° F. | | | |
|---|---|---|---|---|---|
| | | Ethyl | Carbonato Derivative | | |
| | | | β-chloro-ethyl | Iso-propyl | Iso-butyl |
| Gel time, min | 2.2 | 6.9 | 9.2 | 7.4 | 7.1 |
| Cure time, min | 3.4 | 9.5 | 12.5 | 9.6 | 9.5 |
| Peak Exotherm, °F | 451 | 429 | 414 | 428 | 428 |
| Barcol Hardness [1] | 45 | 46 | 42 | 45 | 46 |

[1] Barcol Impressor Reading (Model G YZj–934–1).

POLYMERIZATION OF VINYL MONOMERS

Styrene was chosen as the model aromatic vinyl monomer for polymerization study because of its commercial importance.

Conventional dilatometry was used to measure the rate of polymerization of styrene at 100° C. using 2,5-dimethyl - 2,5 - di(peroxyisopropylcarbonate)-hexene-3 as the initiator.

To 1 deciliter of styrene at 0° C. was added ($5.0 \times 10^{-4}$ moles per deciliter) 2,5-dimethyl-2,5-di(peroxyisopropylcarbonate)-hexyne-3 (assay 96.3%). The solution was placed in a calibrated dilatometer and the polymerization was conducted at 100° C. The rate of polymerization at 10% conversion was $12.0 \times 10^{-3}$ moles/liter/minute.

This compares to the slower rate of $9.5 \times 10^{-3}$ moles/liter/minute using $5.03 \times 10^{-4}$ M/dl. of t-butyl peroxybenzoate.

This having described the invention, what is claimed is:
1. Compounds of the class:

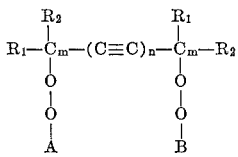

where $n$ is an integer having the value 1 to 2; the straight chain hydrocarbon backbone is selected from the class consisting of —(C≡C)$_n$—, and

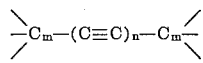

$R_1$ and $R_2$ are selected from the class consisting of aliphatic, cyclohexyl, aromatic, and $R_1$ and $R_2$ joined together to form, with $C_m$, an alicyclic ring; A is an alkoxycarbonyl group,

where R″ is selected from the class consisting of aliphatic, cyclohexyl, and aromatic; and B is selected from the class consisting of A and R′, where R′ is selected from the class consisting of hydrogen, aliphatic, cyclohexyl, and aralkyl and $m$ is an identifying symbol.

2. Compounds of the class:

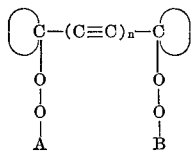

where $n$ is an integer having the value 1 to 2;

is a cycloaliphatic group; A is an alkoxycarbonyl group,

where R″ is selected from the class consisting of aliphatic, cyclohexyl, and aromatic; B is selected from the class consisting of A and R′, where R′ is selected from the class consisting of hydrogen, aliphatic, cyclohexyl, and aralkyl; and the peroxy group (—OO—), is attached to the tertiary carbon atom which is also attached to the —(C≡C)$_n$— group(s).

3. Acetylenic peroxycarbonate derivatives selected from the class consisting of:

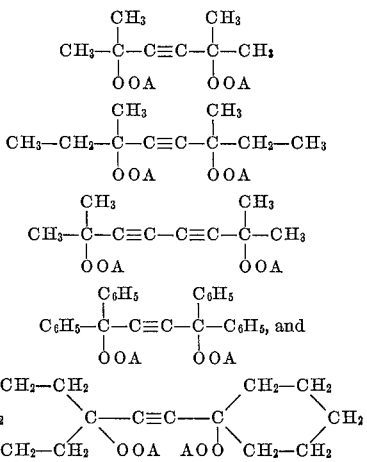

where A is a alkoxycarbonyl group

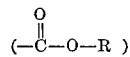

and where R″ is selected from the group consisting of aliphatic, cyclohexyl, and aromatic.

4. 2,5 - dimethyl - 2,5 - di(peroxyethylcarbonate)-hexyne-3.
5. 2,5 - dimethyl - 2,5 - di(peroxy - β - chloroethylcarbonate)-hexyne-3.
6. 2,5 - dimethyl - 2,5 - di(peroxy n-propylcarbonate)-hexyne-3.
7. 2,5 - dimethyl - 2,5 - di(peroxyisopropylcarbonate)-hexyne-3.
8. 2,5 - dimethyl - 2,5 - di(peroxy-n-butylcarbonate)-hexyne-3.
9. 2,5 - dimethyl - 2,5 - di(peroxyisobutylcarbonate)-hexyne-3.
10. 3,6 - dimethyl - 3,6 - di(peroxyethylcarbonate)-octyne-4.
11. 2,7 - dimethyl - 2,7 - di(peroxyethylcarbonate)-octadiyne-3,5.
12. 1,1,4,4 - tetraphenyl-1,4-di(peroxyethylcarbonate)-butyne-2.
13. 2,5 - dimethyl - 2 - peroxy t - butyl - 5 - peroxyethylcarbonate-hexyne-3.
14. Bis(cyclohexyl-1-peroxy ethyl carbonate) acetylene.

References Cited by the Examiner

UNITED STATES PATENTS 2,670,384  2/1954  Milas _____ 260—610
3,117,166  1/1964  Harrison _____ 260—610

JOSEPH L. SCHOFER, *Primary Examiner.*

M. B. KURTZMAN, *Assistant Examiner.*